UNITED STATES PATENT OFFICE.

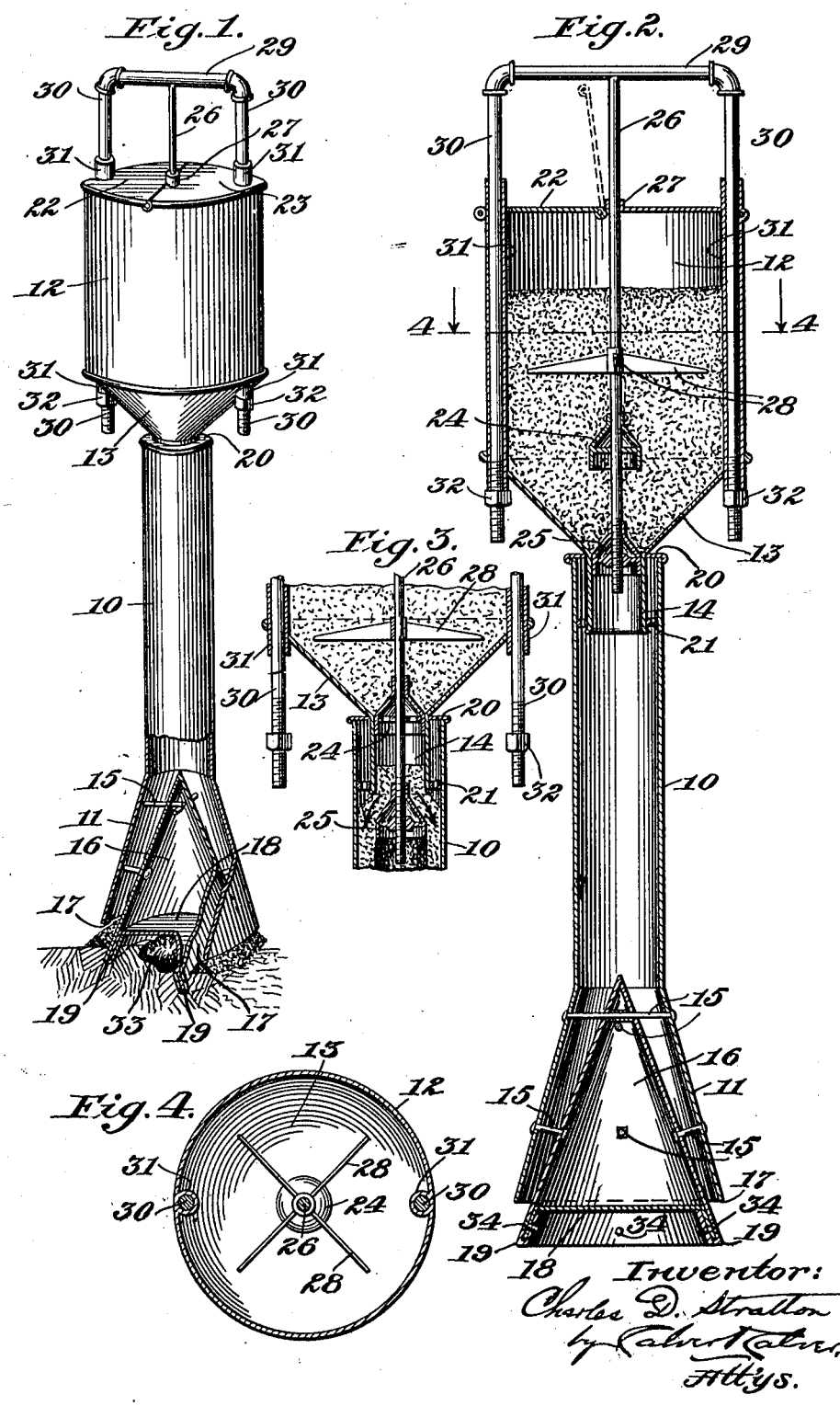

CHARLES D. STRATTON, OF CLINTON, NEW YORK, ASSIGNOR TO GEORGE WILLIAM BROWNING, OF CLINTON, NEW YORK.

FERTILIZER-DISTRIBUTER.

1,314,766.  Specification of Letters Patent.  Patented Sept. 2, 1919.

Original application filed May 6, 1914, Serial No. 836,687. Renewed November 16, 1917, Serial No. 202,425. Divided and this application filed December 18, 1918. Serial No. 267,265.

*To all whom it may concern:*

Be it known that I, CHARLES D. STRATTON, a citizen of the United States, residing at Clinton, in the county of Oneida and State of New York, have invented or discovered certain new and useful Improvements in Fertilizer-Distributers, of which the following is a specification, reference being had therein to the accompanying drawing.

This invention relates to portable, hand-operated distributers or droppers for dry fertilizers, and has for its objects to provide a device of this character which may be quickly and conveniently manipulated, which will at each operation discharge a predetermined quantity of fertilizer and distribute or spread the same in a predetermined manner, which will act to mix the fertilizer so discharged with the soil, which may be employed as a combined planter and fertilizer depositor, and which may be used even in wet or windy weather without clogging and without danger of loss or improper distribution of the fertilizer, all as will be hereinafter fully set forth.

In the drawing Figure 1 is a perspective view, partly broken away, of the complete device, illustrating its method of use. Fig. 2 is a central vertical section showing the feeder valves in normal position. Fig. 3 is a similar view of a portion of Fig. 2 showing the feeder valves in discharging position. Fig. 4 is a horizontal section on the line 4—4, Fig. 2.

Referring to the drawing the invention comprises a tubular body 10 having a flaring or frusto-conical lower end 11 and upon which is superimposed a fertilizer hopper 12 having a funnel-shaped lower end 13 terminating in a feeder tube 14 communicating with the upper end of the body 10.

Fixed within the flaring lower end 11 of the body 10, as by means of rods, bolts or rivets 15, is a hollow conical spreader 16 spaced by said rods or bolts 15 from the lower end of said body to provide an annular discharge space 17. Within the lower end of said spreader is arranged a presser plate 18 for a purpose presently to be described. Said presser plate may be secured to the spreader 16 by any suitable means, as by folding the lower edge 19 of the spreader over a suitably disposed flange on the presser-plate, as shown in Fig. 1. Preferably, however, and as shown in Fig. 2, said presser plate is detachably secured to said spreader as by means of screws 34. The lower edge or rim 19 of the spreader 16 extends below the lower end of the body and below the presser plate 18, thereby locating the discharge space slightly above the extreme lower end of the complete device.

The upper end of the body 10 as shown is closed by a cap 20 having a central opening to receive the feeder tube 14 which is secured thereto in any suitable manner, as by soldering or brazing, said feeder tube being further secured to and spaced from the wall of the body 10 by a spider 21. The top 23 of the hopper 12 is formed with a suitable charging opening preferably closed by a hinged door or cover 22. Coaxially arranged with respect to the feeder tube 14 and coöperating therewith is a pair of conical feeder valves 24 and 25 carried by an operating rod 26 which extends through the hopper 12 and through a suitable opening or guide 27 in the upper end thereof. Carried by the rod 26 within the hopper 12 above the valve 24 is an agitator 28, herein shown as comprising a series of radial arms on a collar fixed to said rod. The feeder valves 24 and 25 are preferably relatively adjustable upon the rod 26, and to this end, in the construction shown, the valve 25 is in threaded engagement with the lower end of said rod, whereby by turning the same it may be moved toward and from the valve 24 to adjust the distance between the two.

The rod 26 is secured at its upper end to a combined supporting and operating handle 29 extending transversely of the apparatus and provided with depending legs 30 which are guided for vertical movement in vertical tubular guides 31 carried by the hopper 12. Adjacent their lower ends the legs 30 are provided with stops 32 coöperating with the lower ends of the guides 31 to limit the vertical movement of the handle 29, said stops, as herein shown, comprising nuts in threaded engagement with the lower ends of said arms and adjustable thereon to adjust the stroke of the handle 29 in accordance with the relative adjustment of the feeder valves 24 and 25.

In use the device is carried in the hand by the handle 29, the stops 32 engaging the lower ends of the guides 31 and limiting the upward movement of said handle, and the parts being in the normal position shown in Fig. 2 with the valve 25 closing the upper end of the feeder tube 14. When it is desired to deposit a predetermined quantity of fertilizer the lower end 19 of the spreader 16 is placed upon the ground at the desired point of deposit and the handle 29 pressed downwardly, thereby forcing said lower end 19 into the ground. Downward movement of the handle 29 causes a corresponding downward movement of the rod 26 carrying with it the feeder valves 24 and 25. As the valve 25 moves downward a quantity of fertilizer from the hopper 12 is permitted to fall into the feeder tube 14 above said valve, after which the valve 24 closes the upper end of said feeder tube while the valve 25 opens the lower end thereof, as shown in Fig. 3, permitting said fertilizer to drop from the lower end of said tube upon the upper end of the spreader 16 and to be discharged through the opening 17 in the form of a ring surrounding said spreader. The handle 29 is thereupon lifted, the first operation being to restore the valves 24 and 25 to their normal position, after which the stops 32 are brought into engagement with the lower ends of the guides 31 and the device as a whole is raised. As the lower edge 19 of the spreader 16, which has been pressed into the ground, leaves the same the action, by reason of the inclination of said edge, is to lift a quantity of soil and mix the same with the fertilizer deposited to a certain extent and partially cover said fertilizer.

In using the device in planting potatoes and the like, a potato (shown at 33 in Fig. 1) is first dropped at the desired point, after which the lower end of the device is placed upon the same and operated as above described. During this operation the presser plate 18 engages the potato and forces the same into the ground, while a ring of fertilizer is deposited around the same, and upon withdrawal of the edge 19 of the spreader from the soil the potato, as well as the fertilizer, is partially covered.

For use in connection with growing plants for the purpose of depositing a ring of fertilizer around the same the presser plate 18 will be omitted or removed, so that when the device is operated the plant in question is received within the hollow conical spreader 16.

The conical valve 25 coöperates with the conical spreader 16 in distributing the fertilizer evenly in a ring at the desired point. It will be observed by reference to Fig. 3 that the fertilizer discharged from the feeder tube 14 leaves the same in the form of an annular or hollow cylindrical stream close to the wall of the cylindrical body 10, so that when said fertilizer reaches the upper end of the spreader 16 it is properly disposed with respect thereto to be evenly spread at the discharge opening 17. This combination of the conical feeder valve with a conical spreader is considered to be of considerable importance inasmuch as it avoids, to a considerable extent, the necessity of holding the device in an accurately vertical position when operating the same in order to produce an even distribution of the fertilizer. It is to be noted in this connection that, with the device held at a great inclination and the fertilizer discharged indiscriminately into the body 10, said fertilizer would fall largely or wholly at one side or the other of the apex of the spreader 16 and therefore be thickly deposited in a portion only of a complete circle.

By the use of the feeder valves 24 and 25 in connection with the feeder tube 14 a very delicate regulation of the amount of fertilizer deposited at each operation may be effected, which amount may be varied at will by adjustment of the valve 25.

The agitator 28 serves at each operation to stir or break up the fertilizer in the hopper 12, thereby insuring the proper operation of the device even in damp weather.

From the foregoing it will be seen that a device is provided which may be easily and expeditiously operated to deposit at each operation a perfectly regulated amount of fertilizer, to spread the same evenly in the desired manner, and to incorporate the same with the soil. It will also be seen that the fertilizer is completely inclosed at all times until a predetermined quantity has been deposited, which quantity is, however, immediately mixed with or covered by the soil, so that the device can be safely operated in windy weather without danger of loss or improper distribution of the fertilizer by being blown away.

The feature of the fertilizer spreading and covering construction at the lower end of the body, hereinbefore described, is not claimed in this application, as the same is covered by my application originally filed May 6, 1914, Serial Number 836,687, and renewed November 16, 1917, Serial Number 202,425, of which case this application is a division.

Having thus described my invention I claim and desire to secure by Letters Patent:

1. A fertilizer distributer comprising a body having a discharge opening, a hopper superimposed upon said body, a feeder tube connecting said hopper and body, an operating rod extending through said hopper, a pair of feeder valves carried by said rod and coöperating with said feeder tube, and an agitator carried by said rod within said hopper and above said feeder tube.

2. A fertilizer distributer comprising fertilizer discharging means, fertilizer feeding means, a combined supporting and operating handle, means for operatively connecting said feeding means and handle, and means independent of said connecting means, for guiding said handle for vertical movement.

3. A fertilizer distributer comprising a body having a discharge opening, a hopper, means for feeding fertilizer from said hopper to said body, an operating rod for said feeding means extending through said hopper, a handle connected with said rod, guides for said handle carried by said hopper, and guiding means carried by said handle and coöperating with said guides.

4. A fertilizer distributer comprising fertilizer discharging means, fertilizer feeding means, a combined supporting and operating handle having depending legs, vertical tubular guides in which said legs are received, and a rod connecting said handle and feeding means.

In testimony whereof I affix my signature.

CHARLES D. STRATTON.

Witnesses:
NATHAN L. HAYES,
R. U. HAYES.

Copies of this patent may be obtained for five cents each, by addressing the "Commissioner of Patents, Washington, D. C."